US012569382B2

(12) United States Patent
Suzuki et al.

(10) Patent No.: US 12,569,382 B2
(45) Date of Patent: Mar. 10, 2026

(54) MOBILITY SUPPORT DEVICE WITH STEP CLIMBING MECHANISM

(71) Applicant: University of Tsukuba, Ibaraki (JP)

(72) Inventors: Kenji Suzuki, Ibaraki (JP); Kai Sasaki, Ibaraki (JP)

(73) Assignee: University of Tsukuba, Ibaraki (JP)

( * ) Notice: Subject to any disclaimer, the term of this patent is extended or adjusted under 35 U.S.C. 154(b) by 720 days.

(21) Appl. No.: 17/907,301

(22) PCT Filed: Mar. 30, 2021

(86) PCT No.: PCT/JP2021/013539
§ 371 (c)(1),
(2) Date: Sep. 26, 2022

(87) PCT Pub. No.: WO2021/200945
PCT Pub. Date: Oct. 7, 2021

(65) Prior Publication Data
US 2023/0106280 A1 Apr. 6, 2023

(30) Foreign Application Priority Data
Mar. 31, 2020 (JP) ................................ 2020-063285

(51) Int. Cl.
*A61G 5/06* (2006.01)
*A61G 5/10* (2006.01)

(52) U.S. Cl.
CPC ........... *A61G 5/068* (2013.01); *A61G 5/1078* (2016.11)

(58) Field of Classification Search
CPC ...... A61G 5/068; A61G 5/1078; A61G 5/043; A61G 2200/36; A61G 5/06
(Continued)

(56) References Cited

U.S. PATENT DOCUMENTS 4,310,167 A * 1/1982 McLaurin ................ A61G 5/06 280/47.16
2005/0077714 A1* 4/2005 Mulhern ............. A61G 5/1078 280/755
(Continued)

FOREIGN PATENT DOCUMENTS

JP 2000-126242 5/2000
JP 2001-037816 2/2001
(Continued)

OTHER PUBLICATIONS

Merged original document (WO 2016006248) with translation; paragraphs added. (Year: 2025).*
(Continued)

*Primary Examiner* — Valentin Neacsu
*Assistant Examiner* — Nathaniel William Watkins
(74) *Attorney, Agent, or Firm* — IPUSA, PLLC

(57) ABSTRACT

A mobility support device capable of stably climbing a step without impairing mobility on flat ground is provided. The mobility support device includes a front wheel, a rear wheel, a drive wheel disposed between the front wheel and the rear wheel, a first link coupled to the front wheel, a second link connecting the drive wheel and the rear wheel, a rotation joint coupling the first link and the second link at a first position, and a first elastic member coupling the first link and the second link at a second position different from the first position.

10 Claims, 14 Drawing Sheets

(58) Field of Classification Search
USPC .......................................................... 280/5.2
See application file for complete search history.

(56) References Cited

U.S. PATENT DOCUMENTS

| | | | | |
|---|---|---|---|---|
| 2005/0206149 | A1* | 9/2005 | Mulhern | A61G 5/1078 280/755 |
| 2007/0039766 | A1* | 2/2007 | Jackson | A61G 5/1078 180/65.1 |
| 2008/0054596 | A1* | 3/2008 | Johanson | A61G 5/06 280/304.1 |
| 2008/0246251 | A1* | 10/2008 | Fast | A61G 5/1051 280/304.1 |
| 2008/0264702 | A1* | 10/2008 | Cheng | A61G 5/06 180/22 |
| 2010/0301576 | A1* | 12/2010 | Dugas | A61G 5/06 280/788 |
| 2017/0172823 | A1* | 6/2017 | Ishikawa | A61G 5/061 |
| 2018/0178706 | A1 | 6/2018 | Takahata et al. | |

FOREIGN PATENT DOCUMENTS

| | | |
|---|---|---|
| JP | 2004-202264 | 7/2004 |
| JP | 2009-219625 | 10/2009 |
| JP | 2012-228996 | 11/2012 |
| JP | 2015-047956 | 3/2015 |
| JP | 2015-180417 | 10/2015 |
| JP | 2018-102496 | 7/2018 |

OTHER PUBLICATIONS

International Search Report of Int. Appl. No. PCT/JP2021/013539 dated Jun. 22, 2021.
Japanese Office Action for 2022-512538 mailed on Aug. 6, 2024.

* cited by examiner

MOBILITY SUPPORT DEVICE WITH STEP CLIMBING MECHANISM

TECHNICAL FIELD

The present invention relates to a mobility support device with a step climbing mechanism.

BACKGROUND ART

Various types of mobility support equipment that act as a substitute for walking are in widespread use. In particular, wheelchairs are widely used as equipment for supporting the mobility of paraplegics. Different wheelchairs corresponding to different user abilities, examples thereof including manual, powered assist and electric wheelchairs. These wheelchairs employ many small wheels (particularly small front wheels) to facilitate movement in rooms with narrow aisles and getting on and off public transportation. Accordingly, even a small step of approximately 5 cm may become a major obstacle to movement.

In light of this, configurations have been proposed that particularly improve the step-climbing ability of wheelchairs. A configuration is known in which a change in the user's center of gravity on the equipment is utilized to lift the front wheels and climb over a step (see Patent Documents 1 and 2, for example). Furthermore, a configuration has been proposed in which excessive rearward inclination of the wheelchair is prevented when driving the rear wheel support with an actuator to lift the front wheels and climb over a step (see Patent Document 3, for example).

CITATION LIST

Patent Literature

Patent Document 1: JP 2004-202264 A
Patent Document 2: JP 2001-37816 A
Patent Document 3: JP 2009-219625 A

SUMMARY OF INVENTION

Technical Problem

In these previously proposed configurations, there is a tendency for the mobility support equipment to have lower movement performance on flat ground. The step climbing mechanism itself also tends to be large and complicated. Furthermore, the user's posture is limited to a sitting posture, which is typical for wheelchair movement.

An object of the present invention is to provide a novel configuration enabling stable step climbing without impairing mobility on flat ground. The present invention particularly provides a configuration in which a step of 150 mm, which is the standard height of a sidewalk curb in Japan, can be stably climbed even in a standing posture.

Solution to Problem

While based on the rocker-bogie mechanism, a new link structure that utilizes the user's posture transition achieves stable and smooth step climbing with a simple passive mechanism.

In a first aspect of the invention, the mobility support device includes a front wheel, a rear wheel, a drive wheel disposed between the front wheel and the rear wheel, a first link coupled to the front wheel, a second link connecting the drive wheel and the rear wheel, a rotation joint coupling the first link and the second link at a first position, and a first elastic member coupling the first link and the second link at a second position different from the first position.

Advantageous Effects of Invention

Stable step climbing becomes possible without impairing mobility on flat ground. By making the position of the center of mass in the mobility support device variable, it is possible to climb not only steps but also grooves. The configuration of the present invention can also be applied to exploration rovers, walking robots, and material transportation, and stable movement and step climbing can be achieved on bad roads or at disaster sites.

DESCRIPTION OF EMBODIMENTS

In the embodiment, while based on the rocker-bogie mechanism, a novel link structure that utilizes posture transition achieves stable and smooth step climbing without impairing mobility on flat ground.

Figure 1:
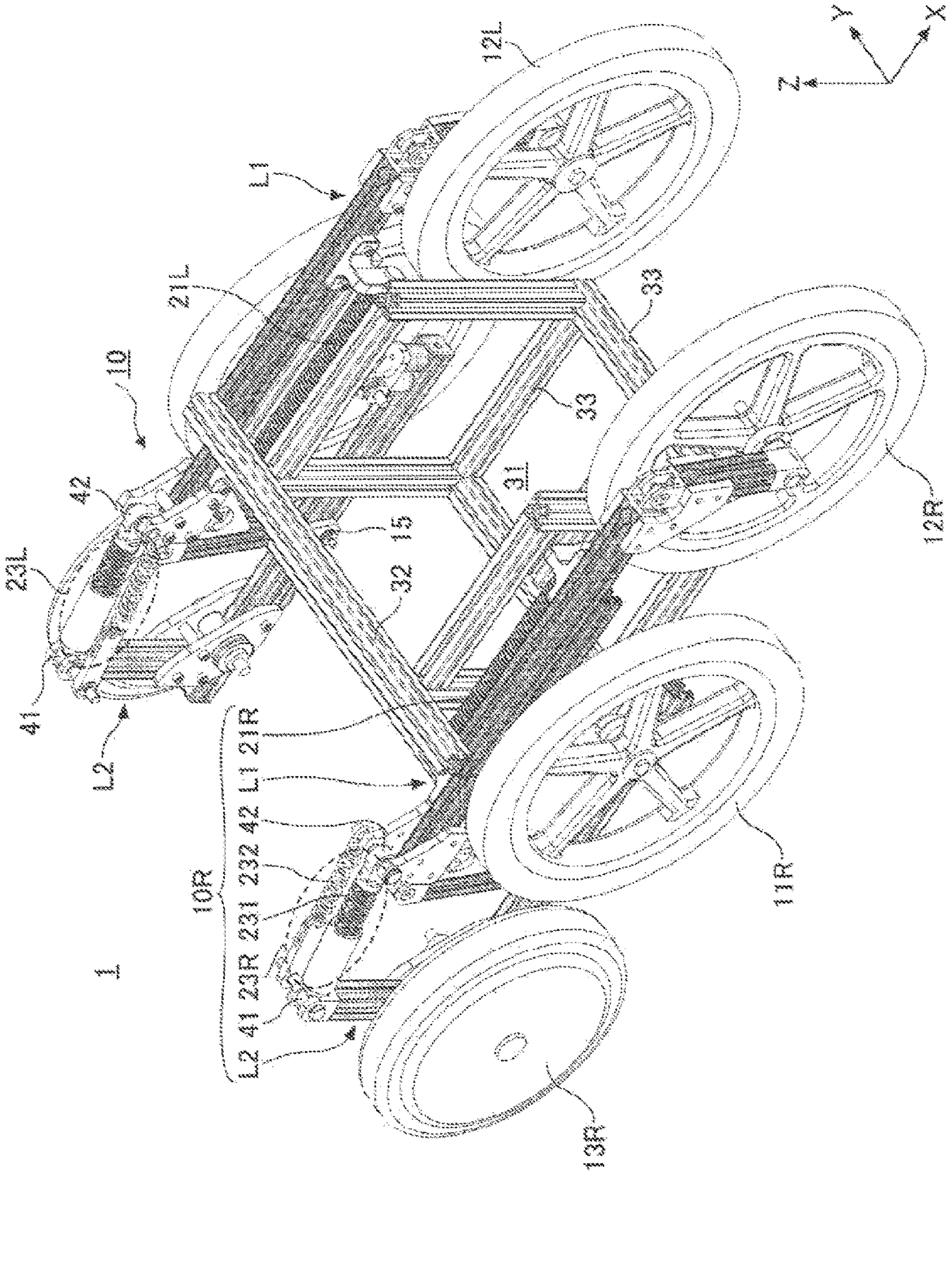
FIG. 1 is a perspective view of a mobility support device according to the embodiment.
Figure 2:
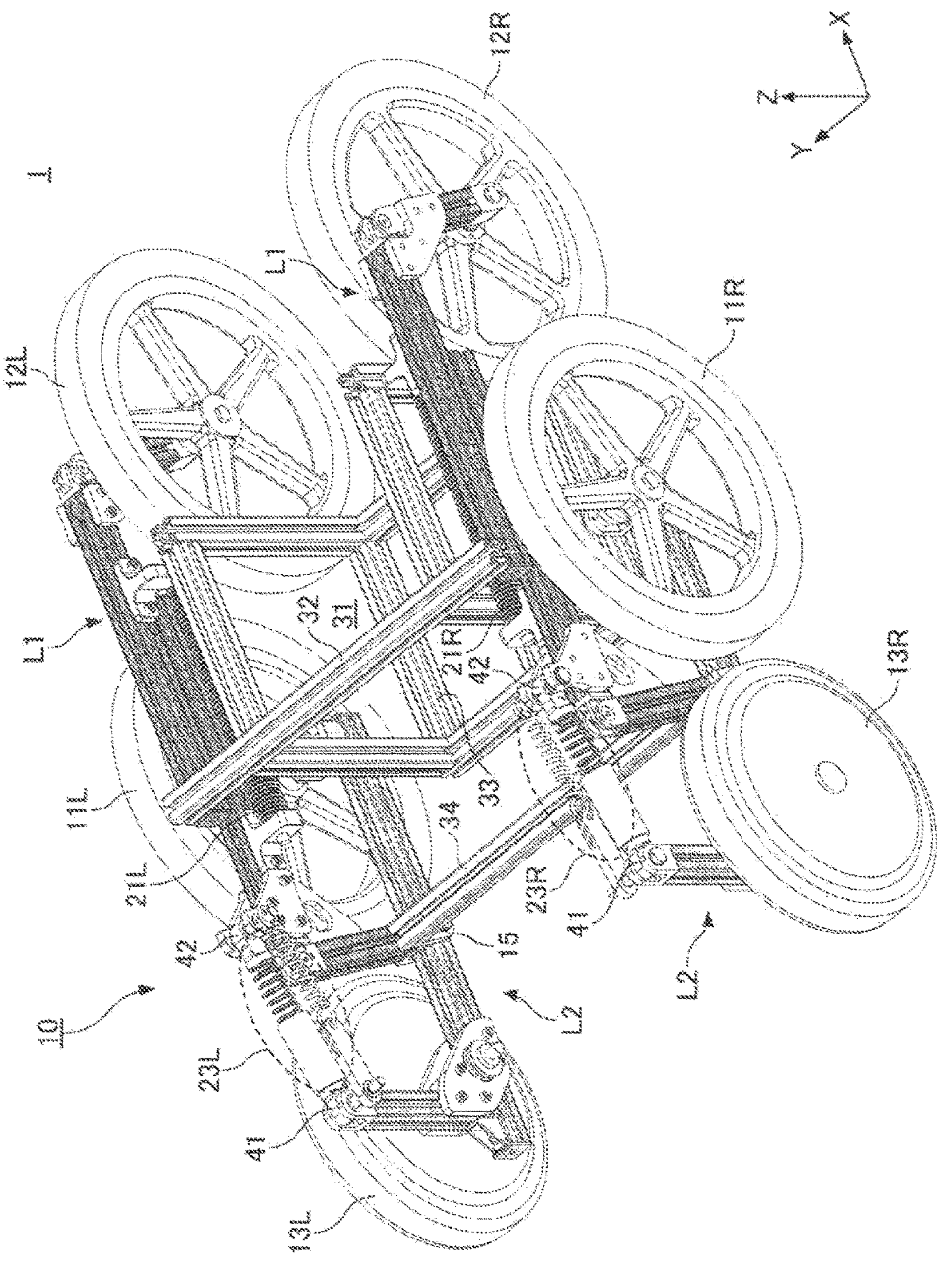
FIG. 2 is a perspective view of the mobility support device according to the embodiment viewed from another direction.

FIG. 1 and FIG. 2 are perspective views of a mobility support device 1 according to the embodiment. FIG. 1 is a diagram viewed from a diagonally forward direction in the travel direction, and FIG. 2 is a diagram viewed from a diagonally rearward direction. The travel direction of the mobility support device 1 is the X direction, the width direction is the Y direction, and the height direction is the Z direction.

The mobility support device 1 includes drive wheels 11R, 11L (hereinafter collectively referred to as "drive wheel 11" as appropriate), front wheels 12R, 12L (hereinafter collectively referred to as "front wheel 12" as appropriate), and rear wheels 13R, 13L (hereinafter collectively referred to as "rear wheel 13"). When moving on flat ground, it is assumed that of the six wheels that make up the drive wheels 11, the front wheels 12, and the rear wheels 13, the drive wheels are subject to greater load. When climbing a step, as described later with reference to FIG. 6A to FIG. 6F, the load distribution acting on the front wheels 12, the drive wheels 11, and the rear wheels 13 changes according to the stage of step climbing.

The drive wheels 11 are rotationally driven by a drive source (not illustrated) and play a primary role in traveling on flat ground. The drive of each drive wheel 11 is performed by a control unit using a processor or the like based on an operation by the user. The drive of the drive wheels 11 is not directly related to the principle of step climbing of the present invention, and so description of this principle will be omitted. The step climbing of the present invention passively converts a transition of the user's center of gravity position and posture into a mechanical state change suitable for step climbing, and is fundamentally different from active step climbing performed by an actuator.

The rear wheels 13 contribute to travel stability when traveling on flat ground. When climbing a step, the rear wheels 13 support backward inclination of the mobility support device 1. The front wheels 12 serve as free wheels. Each front wheel 12 may be a small caster wheel with a sharp turn, provided that the wheel has a radius larger than the height of the step to be climbed or the width of the groove to traverse.

The drive wheel 11, the front wheel 12, and the rear wheel 13 are coupled by a link structure 10. Similar to the wheels, the link structure 10 also includes link structures 10R, 10L disposed on either side of the mobility support device 1. However, the following description focuses on the link structure 10 on either the left or right side.

The link structure 10 has a first link L1 coupled to the front wheel 12 and a second link L2 connecting the drive wheel 11 and the rear wheel 13. The first link may be referred to as a rocker link and the second link may be referred to as a bogey link. The first link L1 and the second link L2 are coupled to each other by a rotation joint 15, and are connected by an elastic member 23 at a position different from the rotation joint 15.

The rotation joint 15 and the elastic member 23 are disposed apart at a constant distance in the vertical direction (Z direction). The rotation joint 15 is composed of, as an example, a shaft and a bearing, and functions as a free joint for rotating the second link L2 with respect to the first link L1.

The elastic member 23 is coupled to the end portion on the rear wheel side of the second link L2 by a node 41, and is connected to the horizontal portion of the first link L1 by a node 42. In the example of FIG. 1 and FIG. 2, the elastic member 23 is composed of a combination of a compression spring 231 and a tensile spring 232, but a single spring that can be stretched and contracted to a required length from an initial length may be used.

The first link L1 is provided with an elastic member 21, and it can extend and shorten in the X direction. By providing the elastic member 21, the distance between the front wheel 12 and the drive wheel 11 is variable according to the posture transition of the user or a change in position of the mass center of the mobility support device 1. As described below, the first link L1 may also have a slider configuration, and the length of the first link L1 in the X direction may be variable in combination with the elastic member 21.

The elastic members 21 and 23 each independently expand and contract according to the displacement or moving of the center of mass of the user or the center of gravity of the mobility support device 1. A moment in the direction corresponding to the expansion or the contraction of the elastic member 23 is generated in the rotation joint 15.

The link structure 10 including the elastic member 23, the elastic member 21, and the rotation joint 15 changes the loads acting on the front wheels 12, the drive wheels 11, and the rear wheels 13 corresponding to the user's posture, to achieve passive step climbing.

The mobility support device 1 also includes an exoskeleton 31. The exoskeleton 31 is coupled to the link structure 10 and supports the user. The exoskeleton 31 has a base frame 33 provided with a foot rest or a bottom plate, and horizontal frames 32 and 34 (see FIG. 2) connecting the left and right link structures 10.

In the example of FIG. 1 and FIG. 2, the base frame 33 has a housing or a hexagonal frame structure, but is not limited to this example. In actual use of the mobility support device 1, a body frame that supports the upper body of the user may be provided.

Figure 3:
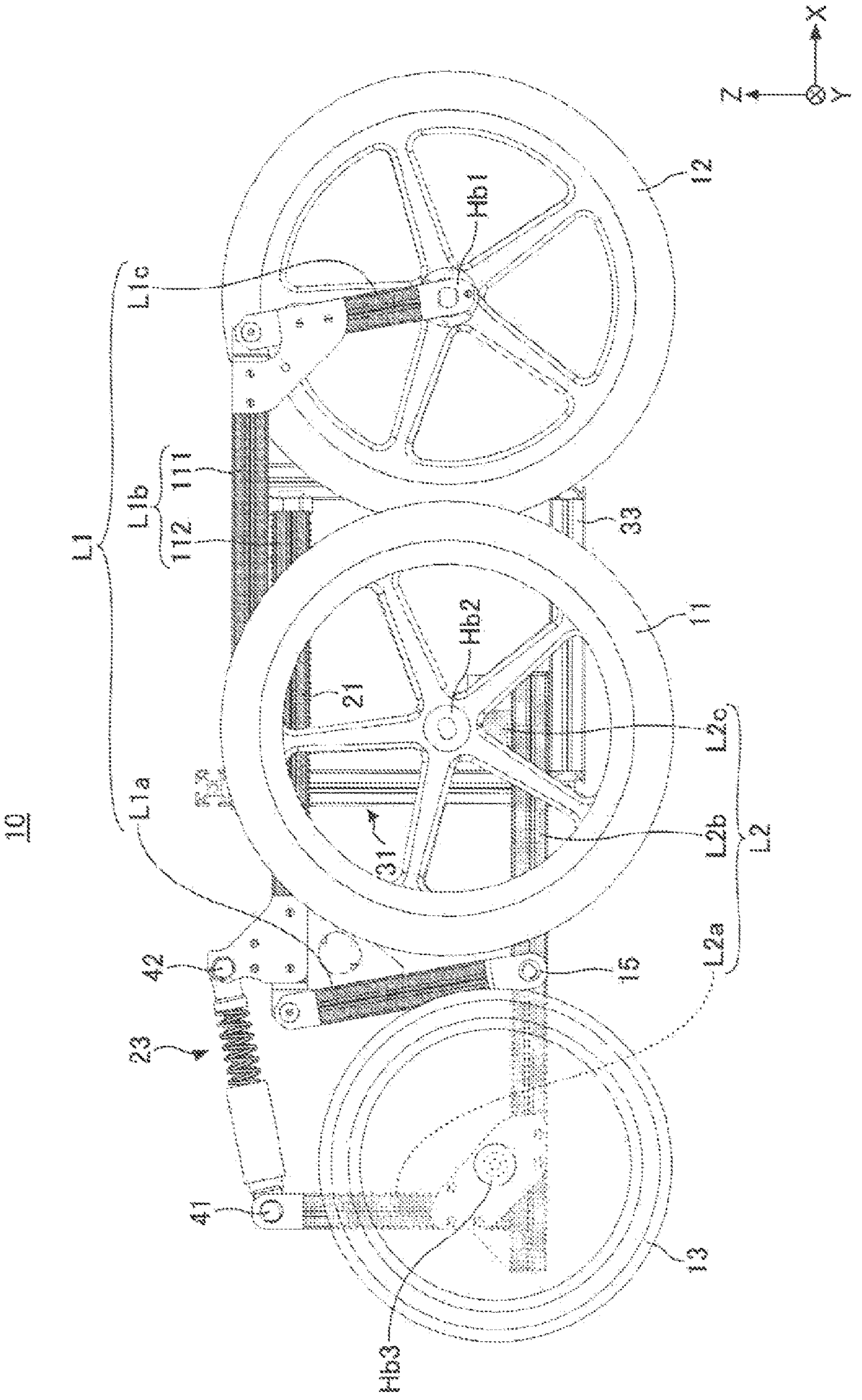
FIG. 3 is a side view of the mobility support device according to the embodiment.

FIG. 3 is a side view of the mobility support device 1. The first link L1 includes a sub-link L1*a*, a slider link L1*b*, and a sub-link L1*c*. The sub-link L1*a* is coupled to the second link L2 by the rotation joint 15. The sub-link L1*c* is coupled to a hub Hb1 of the front wheel 12. The slider link L1*b* is coupled between the sub-link L1*a* and the sub-link L1*c*.

The slider link L1*b* is, for example, a linear slider having an outer rail 111 and an inner rail 112, and is configured to be slidable in the X direction by the elastic member 21. The slider link L1*b* slides under the spring force of the elastic member 21 to change length in the X direction. The sliding of the slider link L1*b* allows the exoskeleton 31 to move forward (+X direction) and rearward (−X direction).

The second link L2 has sub-links L2*a*, L2*b*, and L2*c*. The sub-link L2*b* is coupled to the end portion of the sub-link L1*a* of the first link L1 by the rotation joint 15. One end of the sub-link L2*b* is connected to the sub-link L2*a*, and the other end is connected to the sub-link L2*c*. The sub-link L2*a* is coupled to the slider link L1*b* of the first link L1 via the node 41, the elastic member 23, and the node 42. The sub-link L2*c* is coupled to a hub Hb2 of the drive wheel 11. The connection portion between the sub-links L2*a* and L2*b* is coupled to a hub Hb3 of the rear wheel 13.

The first link L1 is disposed in a downward open U-shape, and the second link L2 is disposed in an upward open U-shape. By connecting the first link L1 and the second link L2 in the reverse direction, the arm of the second link L2 coupled to the rotation joint 15, that is, the sub-link L1*a* can be lengthened. This makes it possible to increase the moment generated in the rotation joint 15 when climbing a step.

By the link structure 10 including the first link L1, the second link L2, the elastic members 21, 23, and the rotation joint 15, the load movement between the drive wheel 11, the front wheel 12, and the rear wheel 13 is achieved.

The mobility support device 1 is configured to be compact in the XZ plane as a whole while lengthening the rotation arm by the link structure 10 in which the first link L1 and the second link L2 are combined in a reverse direction.

Figure 4:
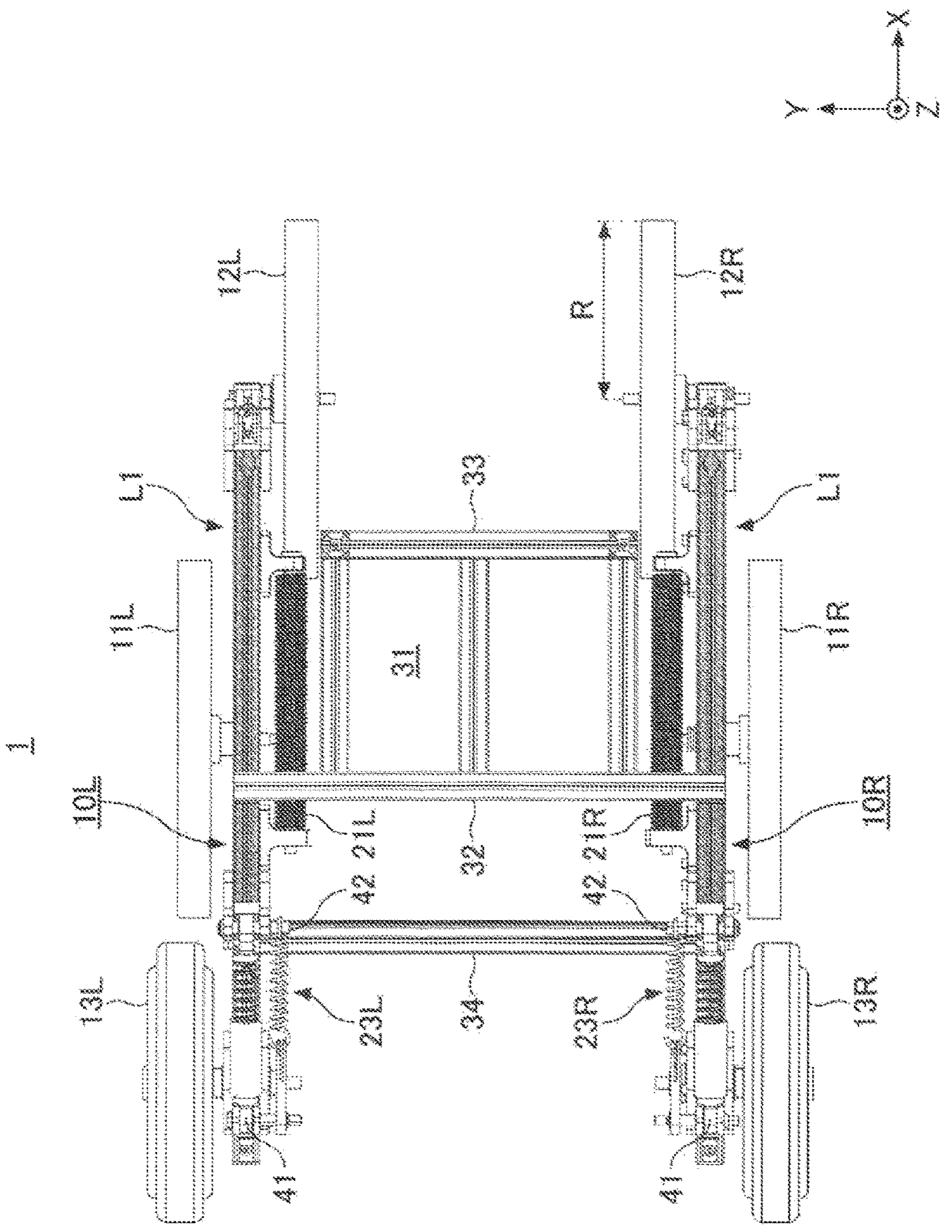
FIG. 4 is a top view of the mobility support device according to the embodiment.

FIG. 4 is a top view of the mobility support device 1. The length in the X direction is approximately 100 cm, and the horizontal width at the position of the drive wheel 11 is approximately 70 cm, but can be appropriately designed corresponding to the application target of the mobility support device 1 and the user's body type.

When the mobility support device 1 is used for support in daily life, the base frame 33 of the exoskeleton 31 is designed to have a size that allows the user to stably stand on the base frame 33 regardless of the state of the user's lower limbs. When the mobility support device 1 is applied to an exploration robot, the robot body can be disposed on the base frame 33. If the user has paraplegia, the body frame and harness belt (not illustrated) of the exoskeleton 31 may support the user's buttocks or lower back in addition to the knees.

A radius R of the front wheels 12R and 12L is set to 200 mm, assuming that a step with a height of 150 mm is climbed. If the mobility support device 1 is to be used in an environment where the step is less than 15 cm, the radius R of the front wheel may be further reduced. The front wheels 12R and 12L may be replaced by planetary wheels.

Figure 5:
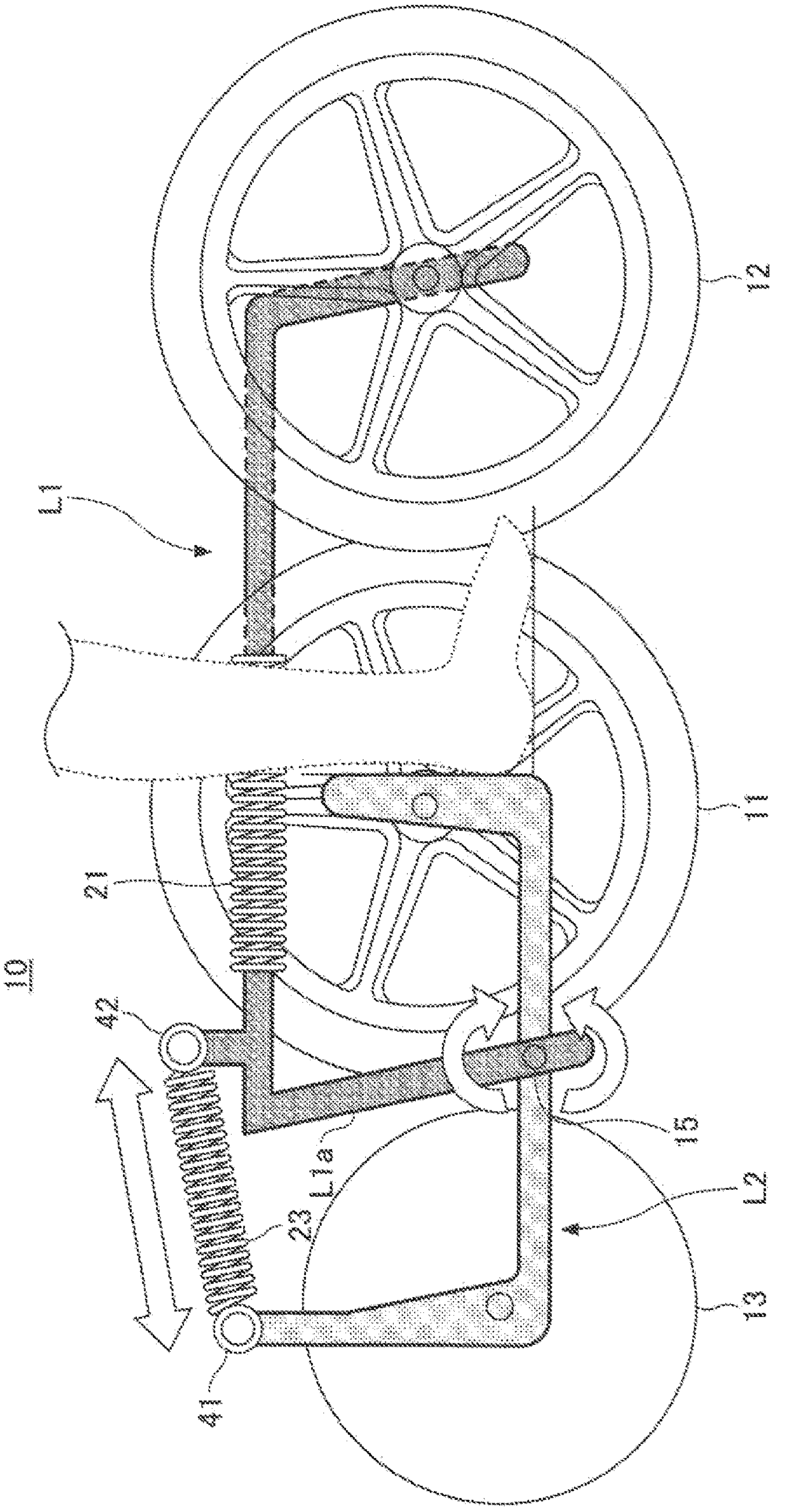
FIG. 5 is a diagram illustrating a link structure for step climbing.

FIG. 5 is a diagram illustrating the link structure 10 for step climbing in more detail. As described above, the link structure 10 includes the first link L1 coupled to the front wheel 12 and the second link L2 connecting the drive wheel 11 and the rear wheel 13.

The first link L1 is provided with the elastic member 21 for adjusting the position of the front wheel 12 in the X direction. The downward open U-shaped first link L1 and the upward open U-shaped second link L2 are combined in a reverse direction and are mutually coupled by the elastic member 23 and the rotation joint 15.

The elastic member 23 is connected to the end portion of the second link L2 at the node 41, and is connected to the first link L1 at the node 42 near the elastic member 21. A sufficient length is provided between the node 42 and the rotation joint 15.

The elastic member 23 can expand and contract in the XZ plane, as indicated by the bi-directional arrow. The rotation joint 15 generates a moment in the clockwise or counter-clockwise direction in response to the expansion or the contraction of the elastic member 23, as indicated by the rotating arrow.

When the front wheel 12 strikes the step, force in the –X direction is applied from the step and the elastic member 21 contracts. At this time, a counterclockwise moment is generated about the rotation joint 15 with respect to the first link L1.

When the front wheel 12 starts climbing the step, the weight movement of the user causes the elastic member 23 to contract, increasing the counterclockwise moment at the rotation joint 15 with respect to the second link L2. The counterclockwise moment on the second link L2 acts in a direction to lift the drive wheel 11. When the front wheel 12 and the drive wheel 11 ride over the step, the contraction of the elastic member 23 is released, and the moment generated in the rotation joint 15 of the second link L2 is inverted to a clockwise moment. This clockwise moment acts in a direction to lift the rear wheel 13.

The counterclockwise and clockwise moments generated in the rotation joint 15 with respect to the first link L1 are proportional to the length of the sub-link L1*a*. With the link structure 10 of the embodiment, the length of the sub-link L1*a* can be increased, and thus a large moment is generated in the rotation joint 15 to strengthen the step climbing ability.

FIG. 6A to FIG. 6F are diagrams illustrating the principle of step climbing. When climbing a step, the drive force is transmitted from the drive wheel to the rear wheel by a power transmission mechanism (not illustrated) and the rear wheel also acts as a drive wheel. Such a power transmission mechanism is achieved by a mechanism using a clutch or timing belt, for example. When climbing a step, the clutch is actuated to transmit the rotational force of the drive wheel to the rear wheel, allowing the drive wheel and the rear wheel to climb the step.

Figure 6A:
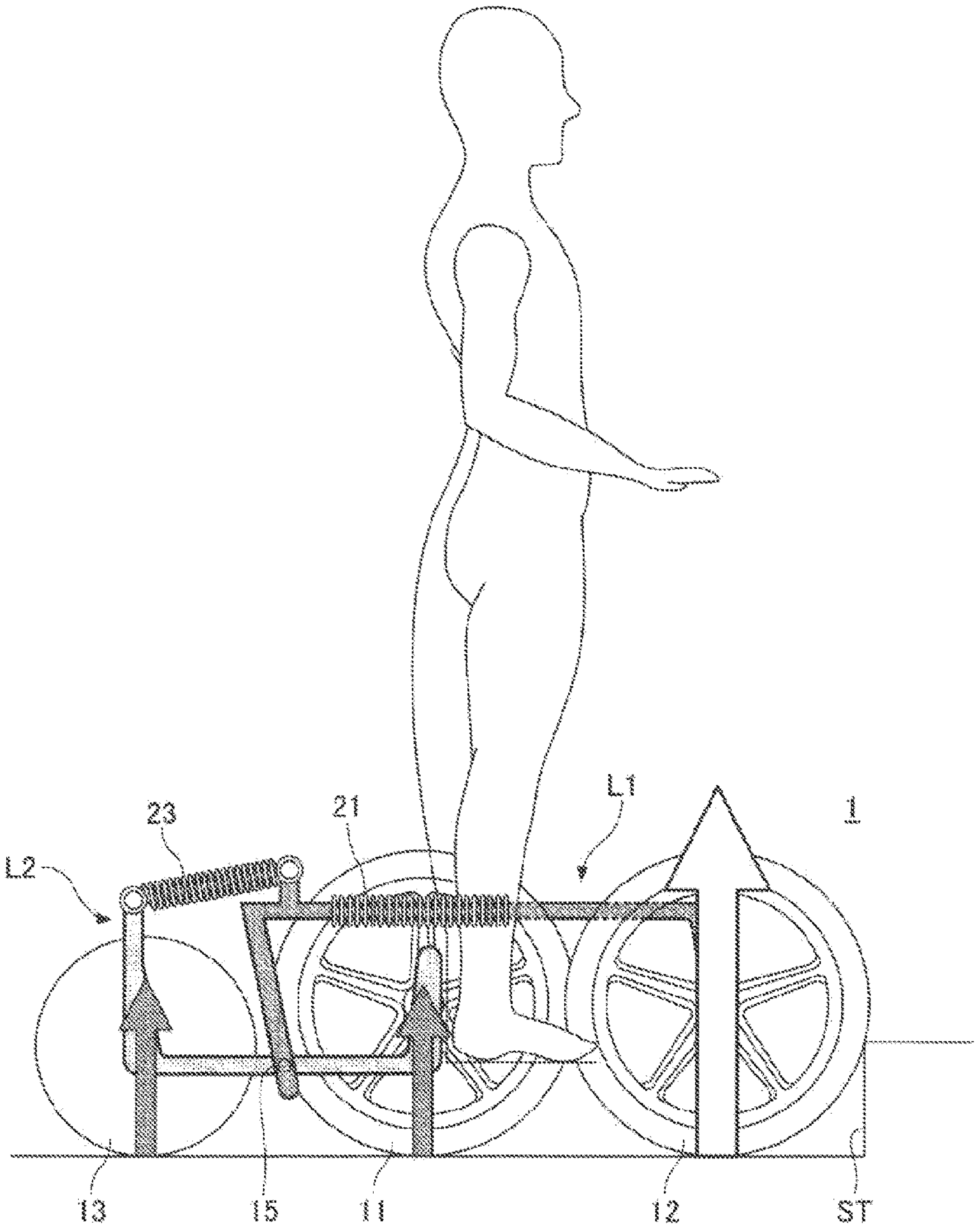
FIG. 6A is a diagram illustrating the principle of step climbing.

In FIG. 6A, the front wheel 12 of the mobility support device 1 comes into contact with a step ST. The posture of the user until just before the front wheel 12 comes into contact with the step ST is a posture when moving on flat ground. The user stands on the drive wheels 11 at an angle of approximately 90 degrees with respect to the ground. The load of the mobility support device 1 is applied more to the drive wheel with respect to the drive wheel 11, the front wheel 12, and the rear wheel 13, and this enables stable travel.

Since the front wheel 12 comes into contact with the step ST, the user's upper body is tilted slightly forward, and the load applied to the front wheel 12 increases. The upward arrows in the diagram schematically represent the load acting on each wheel as the reaction force received from the ground. As the load acting on the front wheel 12 increases, the load acting on the drive wheel 11 and the rear wheel 13 decreases.

Figure 6B:
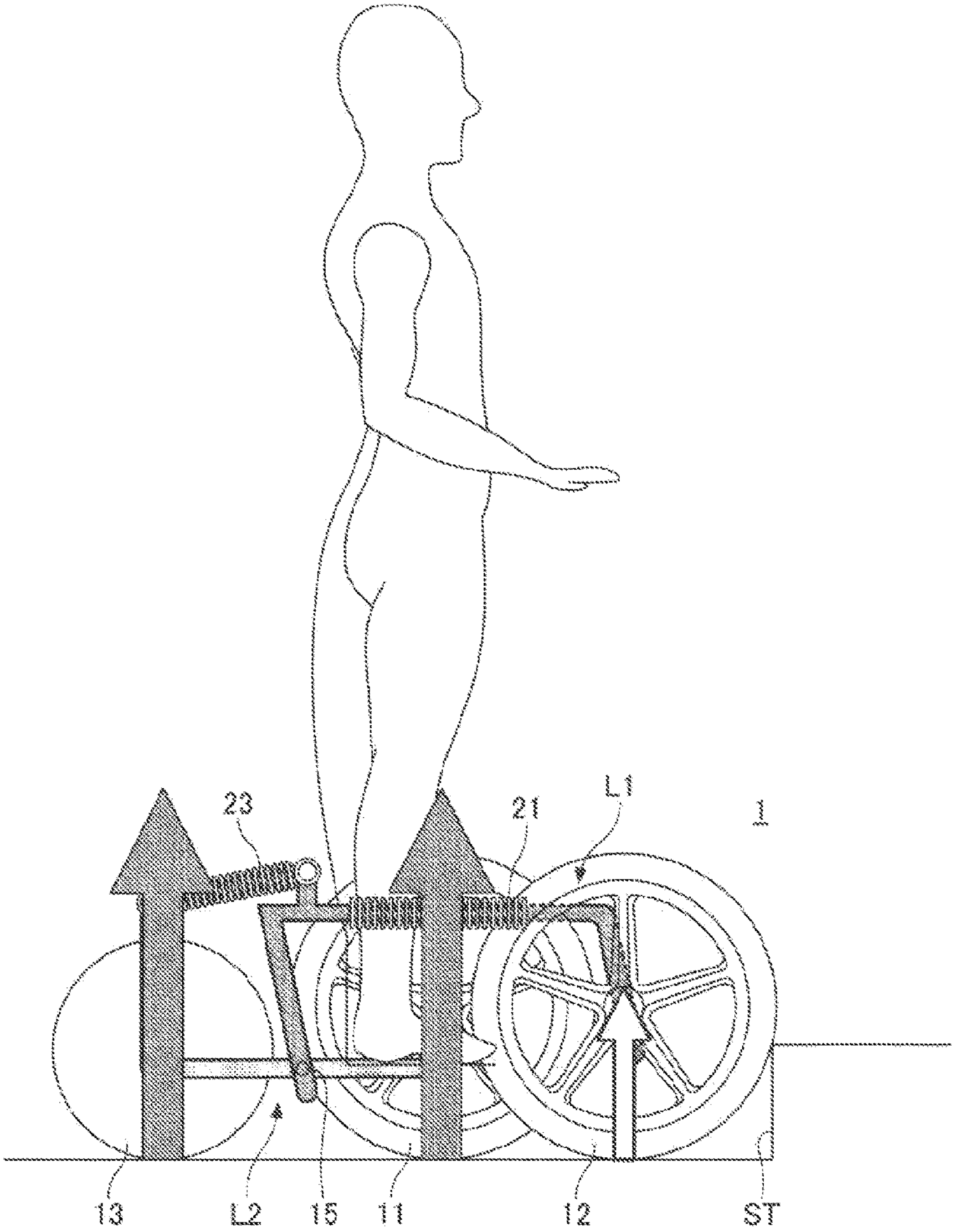
FIG. 6B is a diagram illustrating the principle of step climbing.

In FIG. 6B, the drive wheel 11 continues to rotate even after the front wheel 12 abuts on the step ST. As a result, the first link L1 of the slider configuration including the elastic member 21 is shortened, and the front wheel 12 is retracted toward the direction of the drive wheel 11. However, the front wheel 12 can be returned to the initial position after the step climbing by the compression force of the elastic member 21.

The user is subject to a force in the direction opposite to the travel direction, causing the center of mass of the user to shift backward. The center of gravity of the mobility support device 1 is also shifted rearward, and the dominant load portion is transferred from the front wheel 12 to the drive wheel 11 and the rear wheel 13. Since the load acting on the front wheel 12 is reduced, the front wheel 12 is lifted and starts climbing the step ST.

Figure 6C:
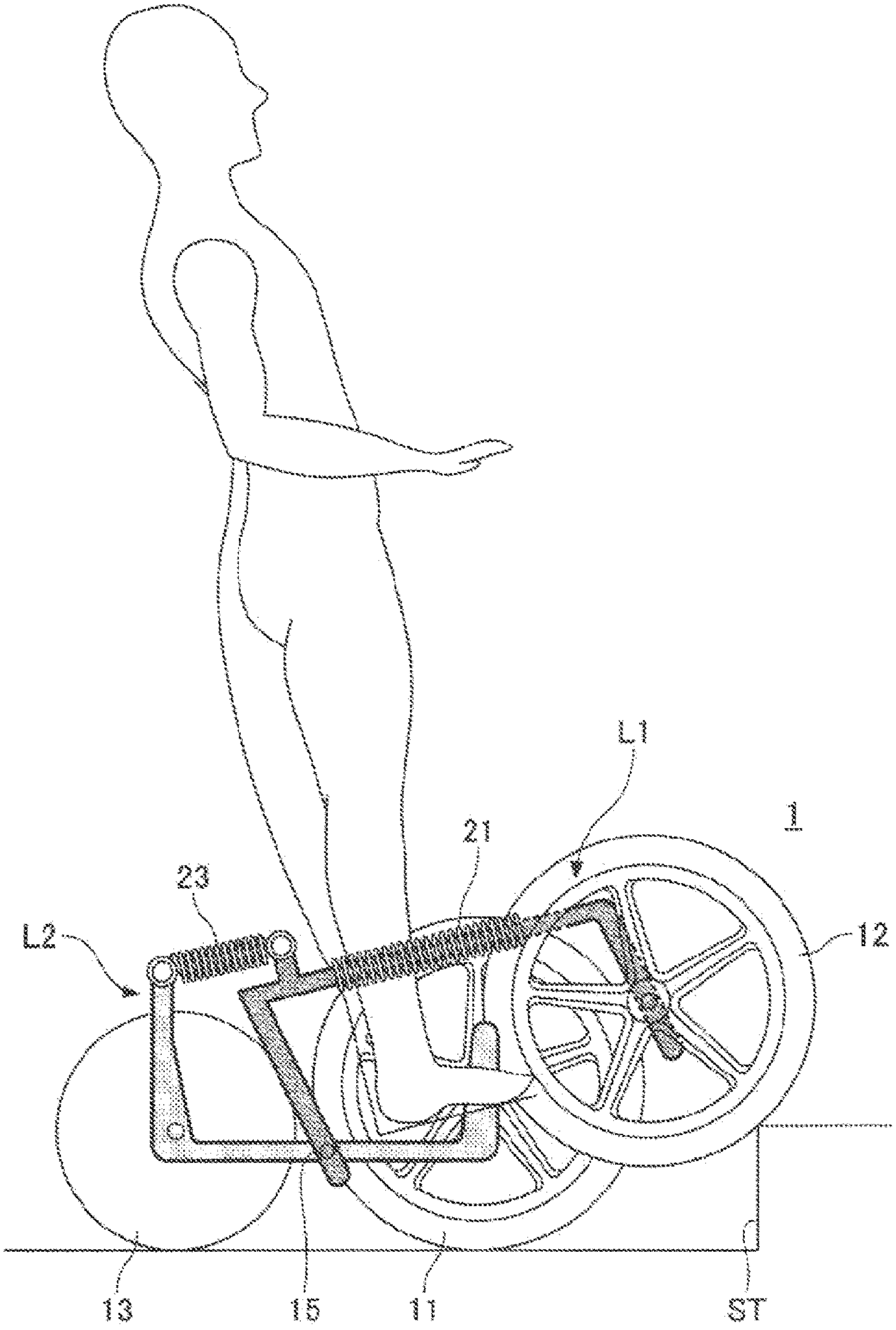
FIG. 6C is a diagram illustrating the principle of step climbing.

In FIG. 6C, the front wheel 12 rides up the step ST. The energy stored in the elastic member 21 is gradually released while the front wheel 12 rides up on the step ST. At this time, the front wheel 12 and the user move in the direction of the step climbing.

Meanwhile, the user and the exoskeleton 31 (see FIG. 1 to FIG. 3) supporting the user tilt backward and the elastic member 23 contracts. The repulsion force generated at this time causes the second link L2 to rotate counterclockwise, and acts in a direction to lift the drive wheel 11.

Figure 6D:
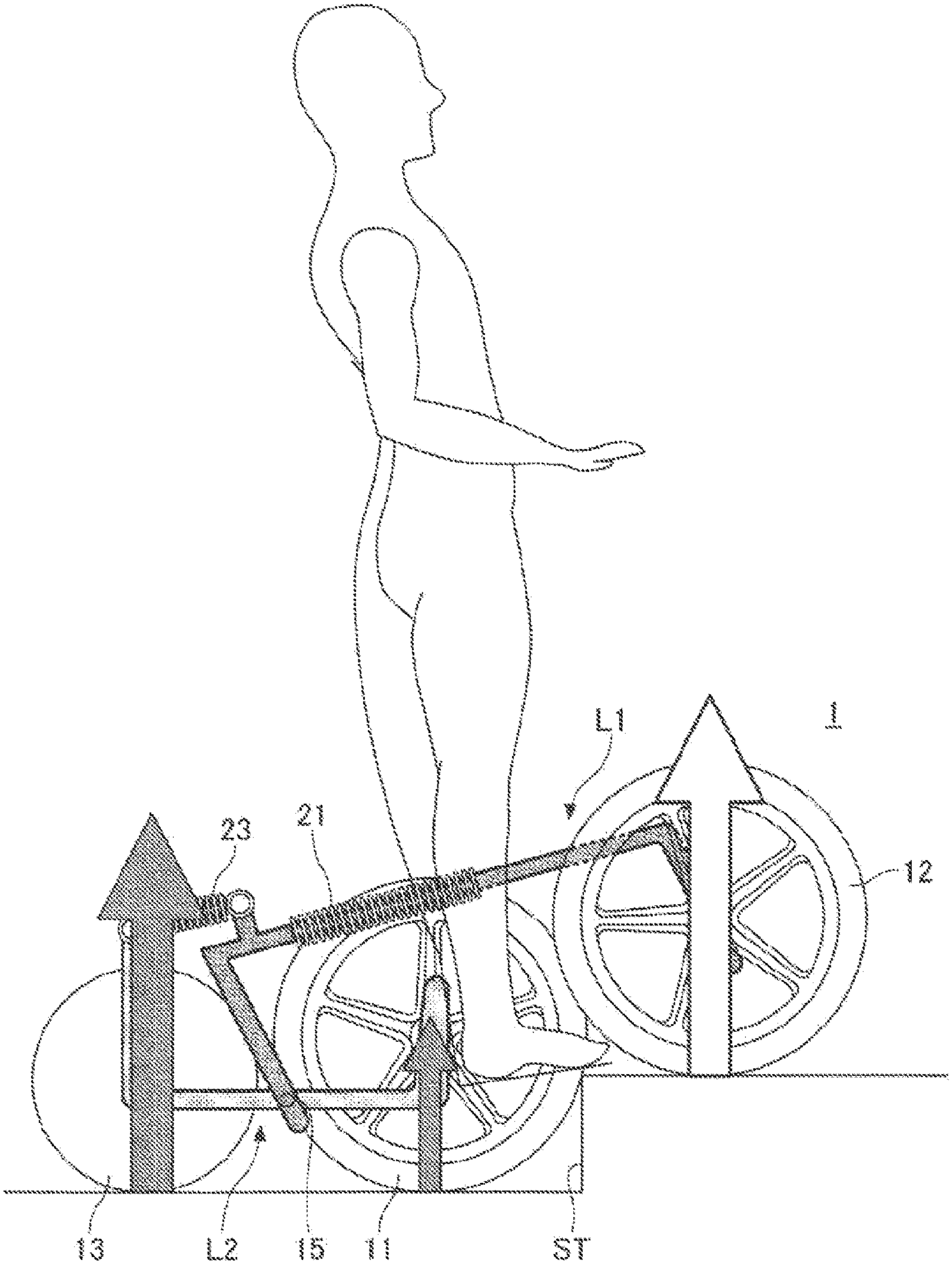
FIG. 6D is a diagram illustrating the principle of step climbing.

In FIG. 6D, with the front wheel 12 completely on the step ST, the drive wheel 11 starts climbing the step ST. At this time, the elastic member 21 is returned to the initial position. Due to the compression of the elastic member 23, a counterclockwise moment acts on the second link L2, and the load acting on the drive wheel 11 is reduced. On the other hand, the load acting on the front wheel 12 and the rear wheel 13 is large. While the drive wheel 11 climbs the step ST, the front wheel 12 and rear wheel 13 stably support the mobility support device 1 in front of and behind the drive wheel 11.

Figure 6E:
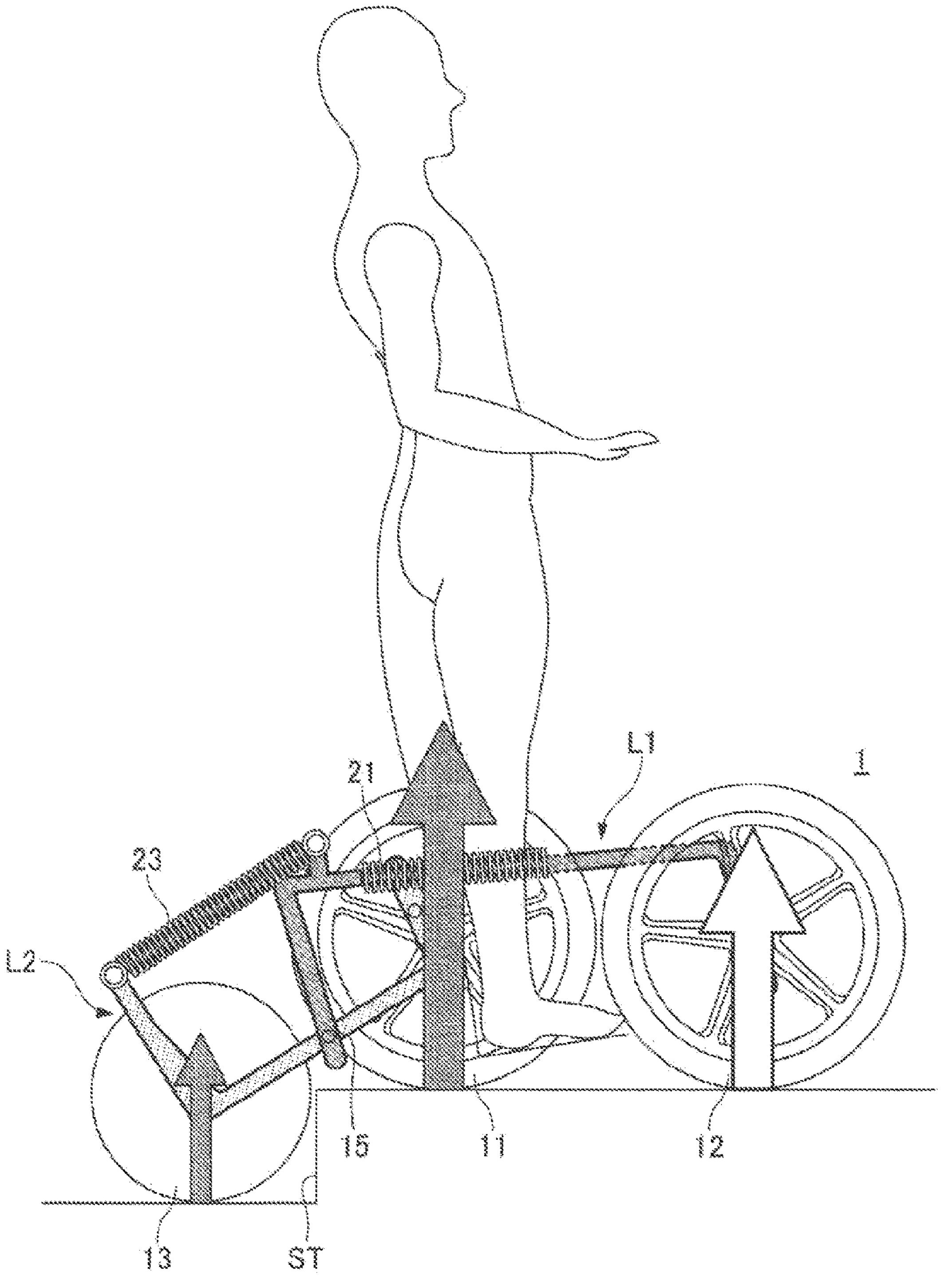
FIG. 6E is a diagram illustrating the principle of step climbing.

In FIG. 6E, the drive wheel 11 moves on the step ST, and the rear wheel 13 starts step climbing. The contracted elastic member 23 expands from the moment when the drive wheel 11 starts climbing the step ST. The expansion of the elastic member 23 rotates the second link L2 in a clockwise direction. A clockwise moment applied to the rotational link L2 acts in a direction to lift the rear wheel 13. At this time, sufficient load is applied to the drive wheel 11 and the front wheel 12 positioned on the step ST to stably support the step climbing of the rear wheel 13.

Figure 6F:
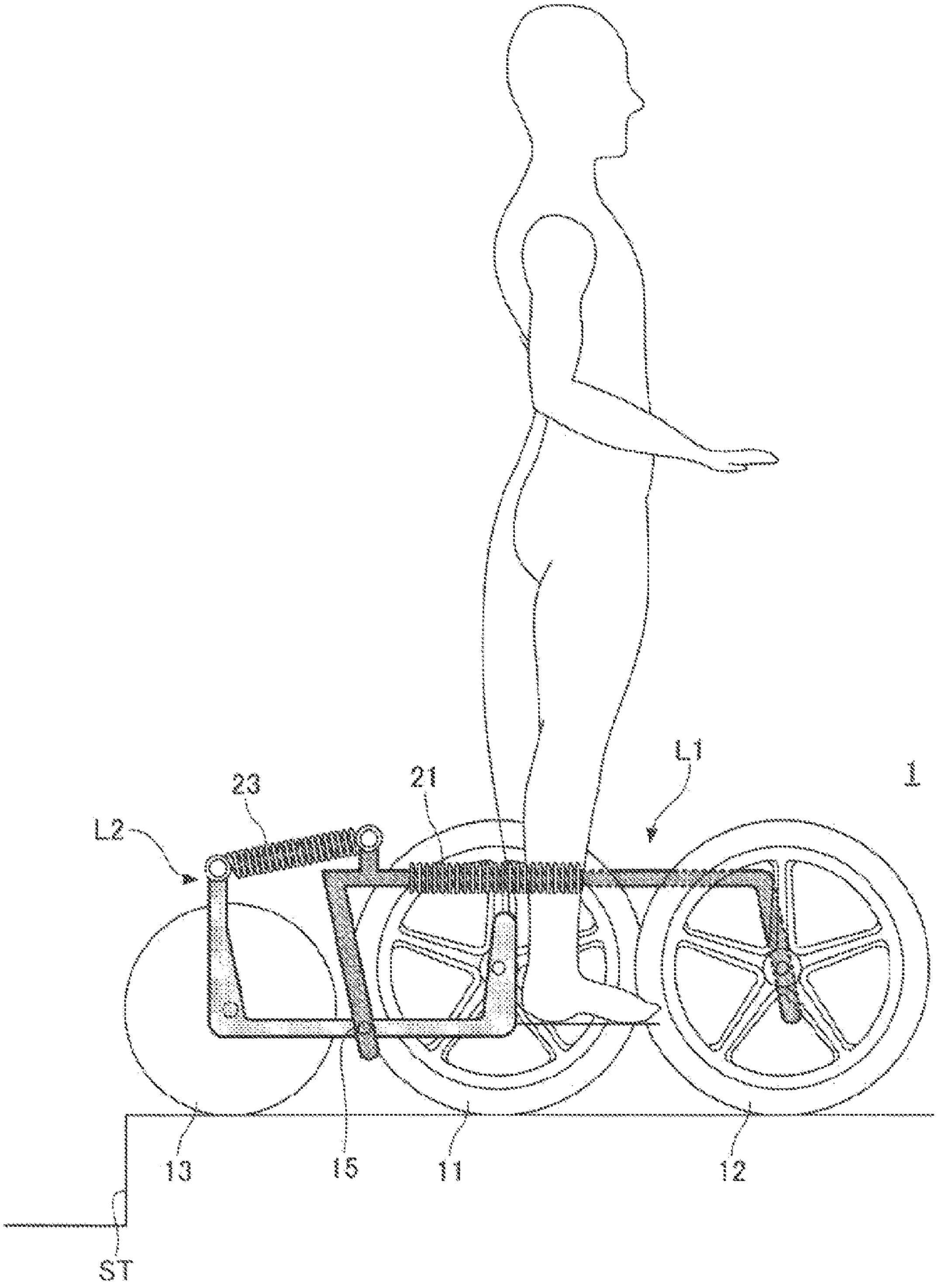
FIG. 6F is a diagram illustrating the principle of step climbing.

In FIG. 6F, the elastic member 23 returns to the initial position, and the rear wheel 13 completely rides on the step ST. From the time when the front wheel 12 comes into contact with the step until the rear wheel fully rides on the step, the shift of the load distribution according to the movement of the center of gravity allows for stable step climbing. In particular, by lengthening the sub-link L1*a* that serves as the arm of the rotation joint 15, a large rotational moment is generated in the link structure 10 having a limited size.

Figure 7:
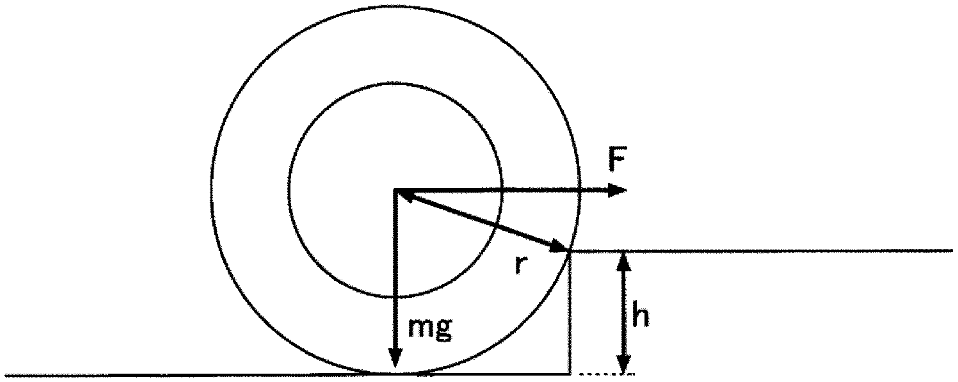
FIG. 7 is a diagram illustrating the propulsion force required for step climbing.

FIG. 7 is a diagram illustrating the propulsion force required for the step climbing. The radius of a wheel W is referred to as r, and the height of the step is referred to as h. The direction of a propulsion force F acting on the wheel W is assumed to be a direction horizontal to the ground. Normal force is omitted for simplicity. From the balance of moments related to the wheel W, the propulsion force F required for step climbing is represented by Equation (1).

$$F = f(m, h, r) = \frac{mg\sqrt{h(2r-h)}}{r-h} \quad \text{[Math. 1]}$$

Here, m is the mass acting on the wheel W, and g is the gravitational acceleration. The propulsion force F depends on the mass m acting on the wheel W, the height h of the step, and the wheel radius r. When the mobility support device 1 is used in an urban area, a target value for the height h of the step is determined according to the Building Standards Act and design. The approximate range of the wheel radius r is also determined according to the assumed usage environment.

A variable that can be arbitrarily varied is the mass m acting on the wheel W. The smaller the mass m acting on the wheel W, the smaller the propulsion force required to climb the step.

Figure 8A:
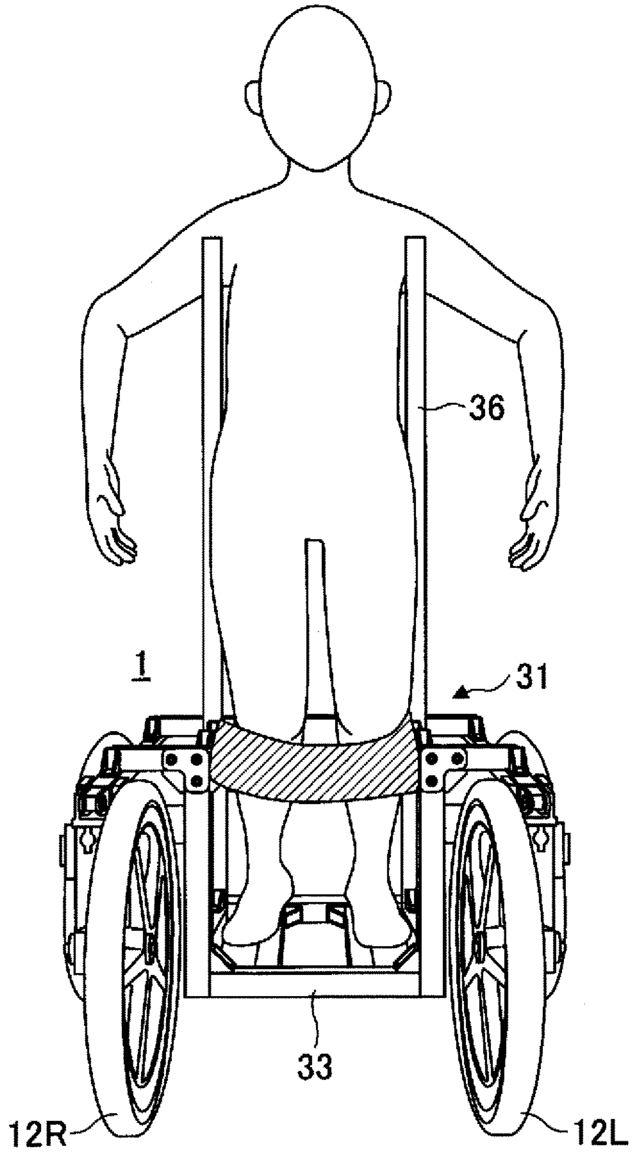
FIG. 8A is a front view illustrating a use state of a test product of a mobility support device.
Figure 8B:
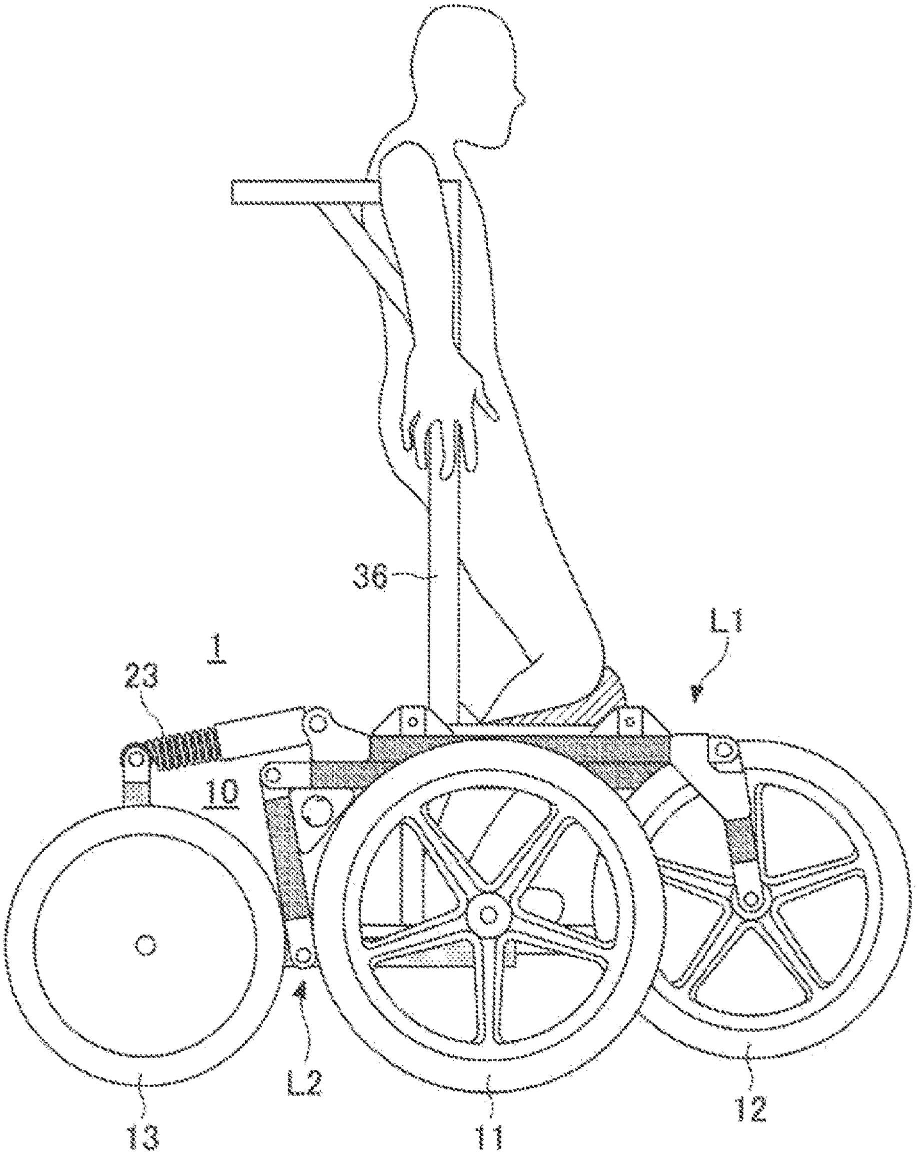
FIG. 8B is a side view illustrating a use state of a test product of a mobility support device.

FIG. 8A and FIG. 8B illustrate a use state of a prototype of the mobility support device 1. FIG. 8A is a front view, and FIG. 8B is a side view. The prototype was made assuming a user with an extension of 1.5 m to 1.8 m and a weight of 50 Kg to 80 Kg, and can travel on flat ground and climb a step when the user is in a standing position. The mobility support device 1 has a width of 70 cm, a length of 105 cm, and a height of 115 cm including a support frame 36 of the exoskeleton. The front wheel and the drive wheel each have a diameter of 385 mm, and the rear wheel has a diameter of 300 mm.

The spring constant of the elastic member 21 used in the slider configuration of the first link L1 is 1.03 N/mm. The spring constant of the compression spring 231 of the elastic member 23 of the second link L2 is 5.23 N/mm, and the spring constant of the tensile spring 232 is 1.67 N/mm. The spring constant of each spring may include an error of ±10% in the above numerical value as an acceptable error for stable step climbing. As the elastic member 23, a single spring that can expand and contract within a desired range from the initial position can be used in place of the combination of the compression spring 231 and the tensile spring 232, as described above.

The spring constants of the elastic member 21 and the elastic member 23 are set to enable movement of the center of mass, that is, the shift of load distribution described with reference to FIG. 6A to FIG. 6F, and to achieve the generation of mechanical power for step climbing. Specifically, these values are appropriately calculated from Equation (1) depending on factors such as the user's weight and usage environment.

With the prototype of FIG. 8A and FIG. 8B, a step climbing experiment was conducted using a 60 kg dummy. The dummy was fixed to the support frame 36 of the exoskeleton 31 and the knees of the dummy were secured with a belt so as not to collapse forward. The drive wheels 11 were driven to attempt to climb a step of 145 mm. When the height of the step to be climbed is 150 mm, the diameter of the front wheel is ideally approximately 400 mm. However, it was confirmed that a step of 145 mm can be stably climbed when the front wheel 12 has a diameter of 385 mm.

The mobility support device 1 of the embodiment is effectively used in the fields of daily life support, care, and rehabilitation. By forming the exoskeleton 31 with a lightweight material having mechanical strength, it is possible to reduce the weight of the mobility support device 1.

The mobility support device 1 utilizes the fact that the combined center of mass of the mobility support device 1 and the user (or the object to be mounted) shifts backward or forward depending on the inclination of the first link L1 and the second link L2 with respect to the horizontal direction, and can also be applied to an exploration robot and material transportation equipment. When the mobility support device 1 is applied to a remote exploration robot or a disaster area support robot, the mobility support device 1 needs to be transported to the site. In this case, the mobility support device 1 is extremely useful due to being small and lightweight and able to stably climb a step.

This application claims priority from Patent Application No. 2020-063285 filed with the Japan Patent Office on Mar. 31, 2020, the entire contents of which are incorporated by reference.

REFERENCE SIGNS LIST

1 Mobility support device
10 Link structure
11 Drive wheel
12 Front wheel
13 Rear wheel
15 Rotation joint
21 Elastic member (second elastic member)
23 Elastic member (first elastic member)
31 Exoskeleton
L1 First link
L1*a* Sub-link (first sub-link)
L1*b* Slider link (second sub-link)
L1*c* Sub-link (third sub-link)
L2 Second link
L2*a* Sub-link (fourth sub-link)
L2*b* Sub-link (sixth sub-link)
L2*c* Sub-link (fifth sub-link)

The invention claimed is:

1. A mobility support device, comprising:
a front wheel;
a rear wheel;
a drive wheel disposed between the front wheel and the rear wheel;
a first link coupled to the front wheel;
a second link connecting the drive wheel and the rear wheel;
a rotation joint coupling the first link and the second link at a first position; and a first elastic member coupling the first link and the second link at a second position different from the first position, the first elastic member being disposed above the first position, wherein the first elastic member is disposed to connect a rear end portion of the second link to a horizontal portion of the first link.

2. The mobility support device according to claim 1, wherein the first link includes a first sub-link coupled to the second link by the rotation joint, a second sub-link, as the horizontal portion, coupled to the second link by the first elastic member, and a third sub-link coupled to the front wheel, and the second sub-link has a variable length.

3. The mobility support device according to claim 2, wherein the second link includes a fourth sub-link, as the rear end portion, coupled to the first elastic member, a fifth sub-link coupled to the drive wheel, and a sixth sub-link connecting the fourth sub-link and the fifth sub-link, and the sixth sub-link is coupled to an end portion of the first sub-link by the rotation joint.

4. The mobility support device according to claim 1, wherein the second link includes a fourth sub-link, as the rear end portion, coupled to the first elastic member, a fifth sub-link coupled to the drive wheel, and a sixth sub-link connecting the fourth sub-link and the fifth sub-link, and the sixth sub-link is coupled to the first link by the rotation joint.

5. The mobility support device according to claim 1, wherein the first link includes a slider mechanism that is slidable in a travel direction.

6. The mobility support device according to claim 5, wherein the slider mechanism includes a second elastic member configured to stretch in the travel direction.

7. The mobility support device according to claim 6, wherein the second elastic member returns the front wheel that retracts in a direction of the drive wheel during step climbing to an initial position.

8. The mobility support device according to claim 1, wherein the first link is a downward open U-shaped link, the second link is an upward open U-shaped link, and the first link and the second link are coupled to each other in a reverse direction.

9. The mobility support device according to claim 1, wherein contraction of the first elastic member generates a counterclockwise moment in the rotation joint, and expansion of the first elastic member generates a clockwise moment in the rotation joint.

10. The mobility support device according to claim 1, wherein the first elastic member is disposed between the first link and the second link as a separate member.

* * * * *